United States Patent [19]
Jachmich

[11] Patent Number: 5,618,082
[45] Date of Patent: Apr. 8, 1997

[54] QUICK INSTALL COVER FOR A SEAT

[76] Inventor: Manfred F. Jachmich, 5100 San Felipe East Four Leaf Tower, Apt. 111-E, Houston, Tex. 77056

[21] Appl. No.: 714,242

[22] Filed: Sep. 16, 1996

[51] Int. Cl.[6] ............................................. A47C 31/00
[52] U.S. Cl. .................... 297/229; 297/228.1; 297/219.1
[58] Field of Search ........................... 297/218.1, 219.1, 297/225, 224, 228.11, 228.1, 229, 220; 2/69, 69.5

[56] References Cited

U.S. PATENT DOCUMENTS

| | | | |
|---|---|---|---|
| 1,547,085 | 7/1925 | Tucker | 2/69.5 |
| 2,619,156 | 11/1952 | Seaman | 297/228.11 |
| 3,892,440 | 7/1975 | Dudley et al. | 297/229 |
| 4,232,898 | 11/1980 | Bodrero | |
| 4,400,030 | 8/1983 | Maruzzo et al. | 297/228.1 |
| 4,536,028 | 8/1985 | Jones et al. | 297/224 |
| 4,671,568 | 6/1987 | Greer | 297/229 |
| 4,676,376 | 6/1987 | Keiswetter | |
| 4,694,511 | 9/1987 | Estes et al. | 2/69 |
| 4,718,721 | 1/1988 | Pompa | 297/229 |
| 4,725,094 | 2/1988 | Greer | 297/229 |
| 4,877,288 | 10/1989 | Lee | 297/229 |
| 4,892,353 | 1/1990 | Goddard | 297/224 |
| 5,005,901 | 4/1991 | Hinde | 297/229 |
| 5,150,945 | 9/1992 | Aupperlee et al. | |

OTHER PUBLICATIONS

Automotive Interiors by Sagaz®, Natural Sheepskin Limited Edition, Part #300107B, Label Pt# 3061-752-00-01 (2 pages).
Precision Auto Designs, A Division of First Automotive, Inc. a California Corporation, 1995 Edition XIII Our 18th Year. Cover page and page 5 (2 pages total).
1992 BMW Accessories, ©1991 BMW of North America, Inc. Cover page, page 18 and part number page for page 18 and back cover page (4 pages total).
Neimen Marcus Catalog 1996 with Item 30J with photo (one page).
Organize-It-All, Inc. Moonachie, N.J. 07074 ©1993, Sweater Bags, Style No. 625 (one page).
Original BMW Accessories ©1994 BMW of North America, Inc., cover page, pp. 29, 68, 69 (including below Part No. 82 11 1 467 706) and back cover page (5 pages total).
Original BMW Accessories ©1995 BMW of North America, Inc. Cover page, pp. 33 and 54–56 (including below Part No. 82 11 1 467 706) and back cover page (4 pages total).
Copy of photo from box of BMW Part No. 82 11 1 467 706 for "Custom Seat Savers™ cover" as shown in Figures 9–12 of the present application.
Seat Savers® Installation & Care Instructions, Form #1320018 for cover as shown in Figures 9–12 of the present invention, along with a copy of Invoice No. 68781 from Momentum BMW purchased Aug. 27, 1996.
Enlarged copy of tag from "Royal Velvet" terry cloth towel by Fieldcrest of Kannapolis, NC, one page (admitted prior art).

*Primary Examiner*—Peter M. Cuomo
*Assistant Examiner*—Anthony D. Barfield
*Attorney, Agent, or Firm*—Pravel, Hewitt, Kimball & Krieger

[57] ABSTRACT

A one-piece terry cloth member sized to cover a seat includes a terry cloth top section selectively sewn to the cloth member to provide a first opening to allow the top of the cover to pass over the headrest while limiting downward and lateral movement of the cloth member covering the front portion of the seat back. A cloth bottom section is selectively sewn to the cloth member to provide a pocket. The pocket is pulled onto a seat, preferably placing a small amount of tension on the cloth member, to limit rearward and lateral movement of the cloth member on the seat cushion. Advantageously, a portion of the cloth bottom section is detached from the cloth member to cover the front face of the seat cushion.

20 Claims, 3 Drawing Sheets

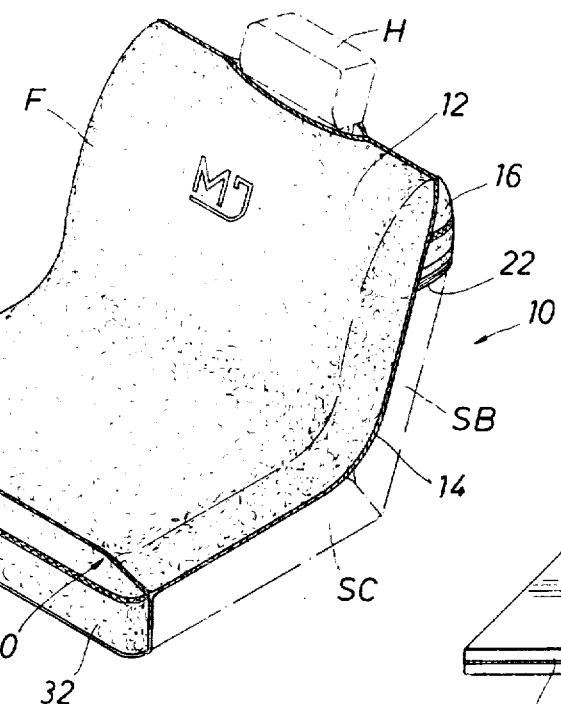
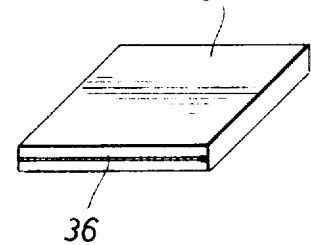
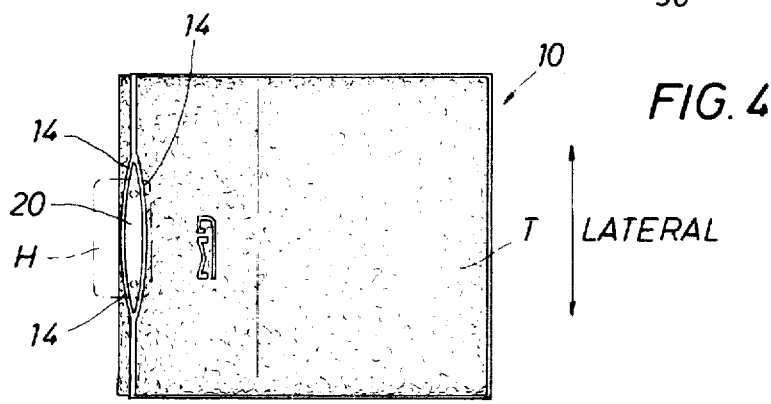
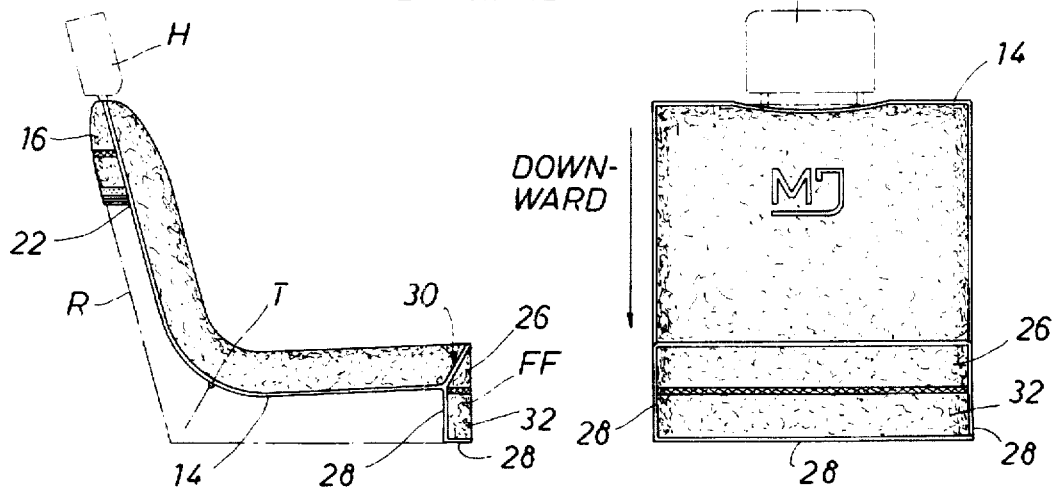
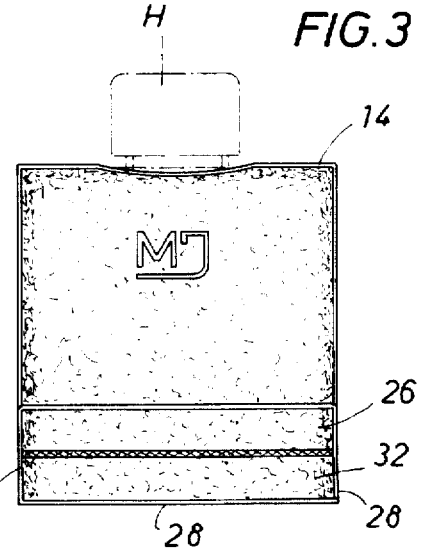

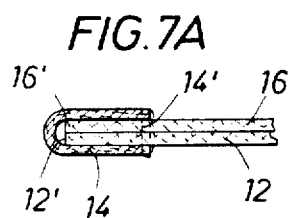
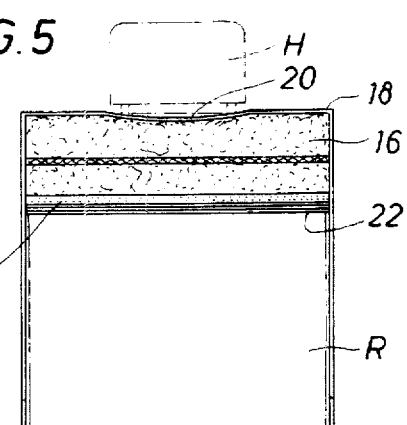
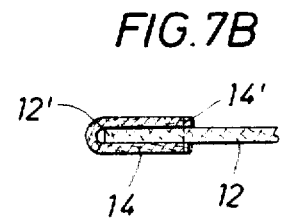
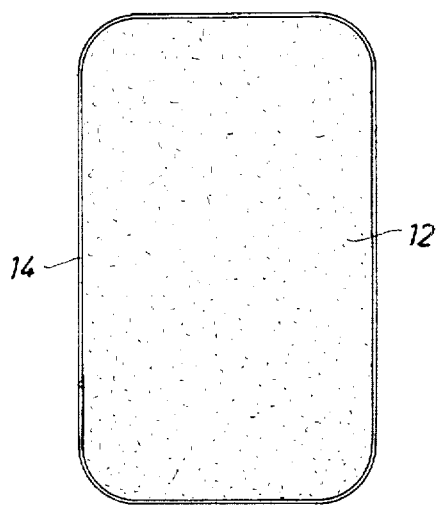
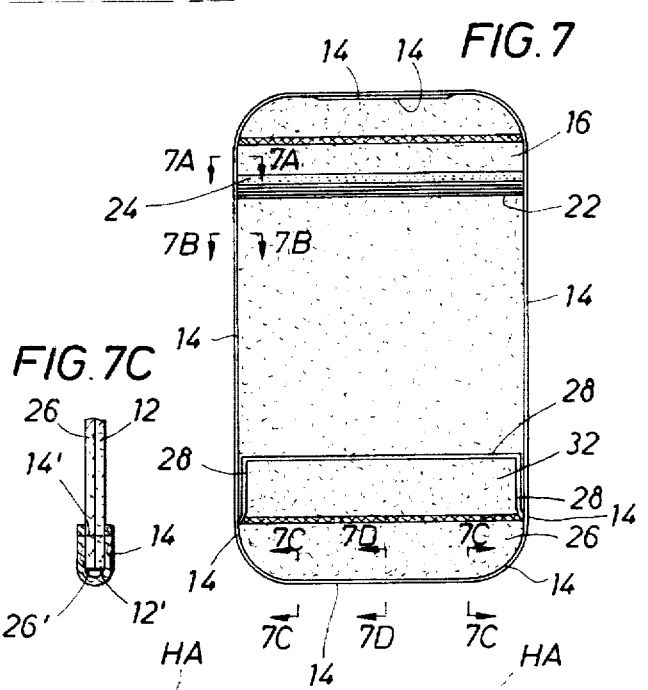
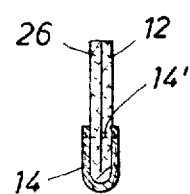
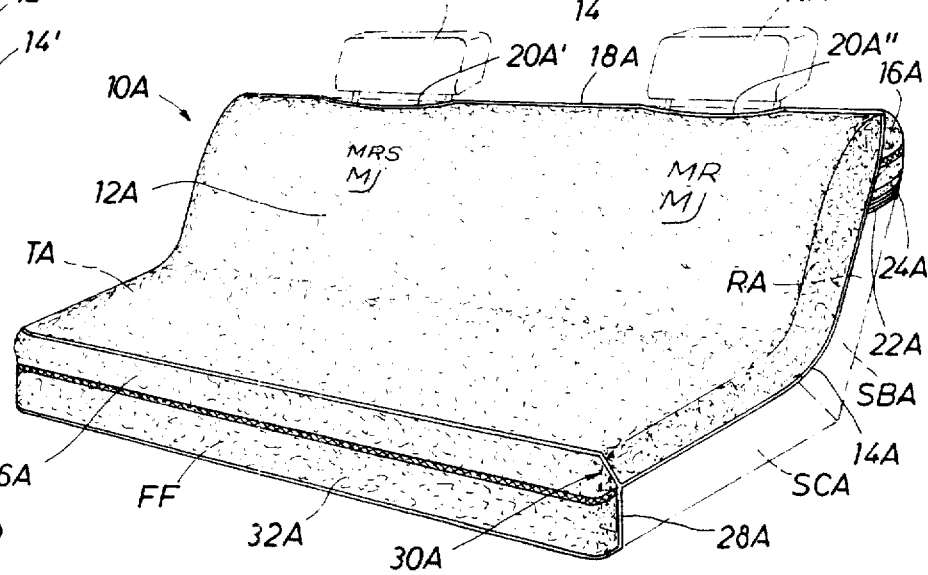

FIG. 9 (PRIOR ART)
FIG. 10 (PRIOR ART)
FIG. 11 (PRIOR ART)
FIG. 12 (PRIOR ART)
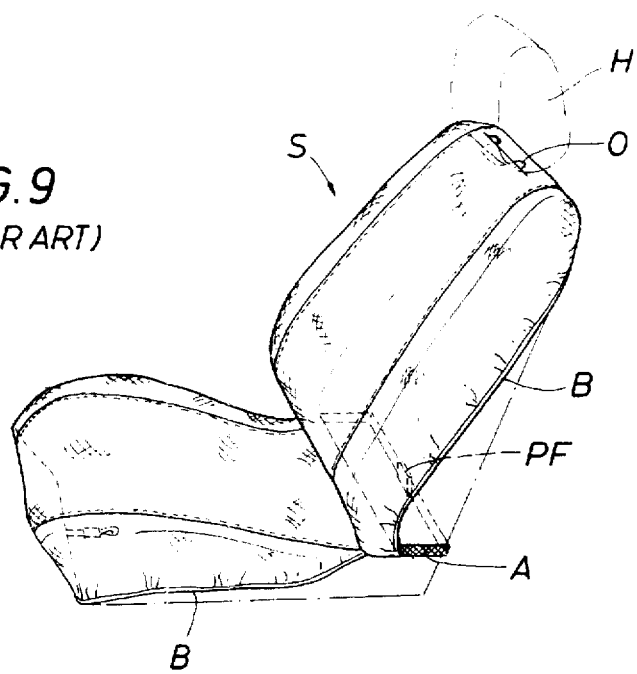
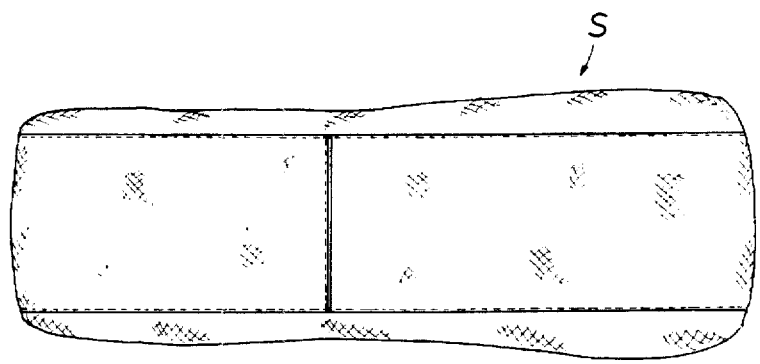
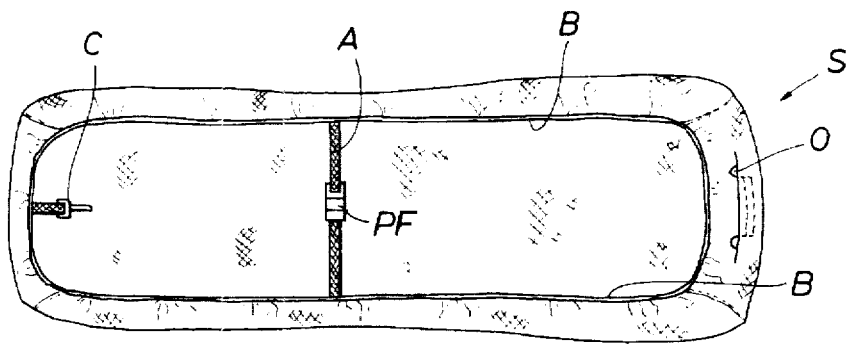

QUICK INSTALL COVER FOR A SEAT

FIELD OF THE INVENTION

The present invention relates to a cover adapted for use with a seat having a headrest. In particular, the present invention relates to a quick install and removal cover adapted for use with a seat including a seat back and a seat cushion. The cover of the present invention may be used with seats used in vehicles and vessels, including cars and boats.

BACKGROUND OF THE INVENTION

In general, covers for seats have been known in the past. For example, polyethylene sheets or film for temporary protective seat covers for automobiles taken in for repairs have been disclosed in U.S. Pat. No. 4,676,376. However, the plastic seat cover proposed in U.S. Pat. No. 4,676,376 does not include an opening at its top nor does the cover include a pocket to limit rearward or lateral movement of the cover relative to the seat cushion.

U.S. Pat. No. 4,694,511 proposes a garment for bathers that also can be used as a protective cover for a vehicle seat or a beach chair. In particular, FIG. 5 of U.S. Pat. No. 4,694,511 shows the combination garment/protective cover where the neck collar portion is received over and positioned about the base of a headrest. As shown in FIGS. 5 and 7 of the '511 patent, the headrest appears to be integral and not moveable relative to the seat. The garment/protective cover also covers the top of the seat cushion and the front face of the seat cushion using straps 18 and 19 located on both sides of the seat cushion in an attempt to limit rearward movement of the garment/protective cover. The '511 patent in col. 1, lns. 19–27 further emphasizes the problems in the past of merely draping a towel on the vehicle seat since the towel would not be secured to the seat and the draped towel, without an opening, obscures the driver's rear view if the cover is used to cover a headrest, now present with most modern vehicle seats.

U.S. Pat. No. 4,892,353 proposes a cover for a lounge chair where the front portion of the seat back includes an indicia which may be silk screened or appliqued to the fabric, as indicated in col. 4, lns. 16–22. The proposed indicia may be decorative or may carry an advertising message, as for example, an advertisement for a particular resort or recreational product. As stated in col. 2, lns. 24–26 and lns. 59–62 of the '353 patent, in one embodiment the material for covering the lounge chair is an absorbent toweling or terry cloth material.

U.S. Pat. No. 5,150,945 proposes a vehicular child seat cover fabricated from sheet fabric, sheet plastic or plastic coated fabric. The cover of the '945 patent proposes an elasticized upper hem to provide a snug fitting sleeve top to fit a variety of backs without adjustment. The bottom hem of the cover is also elasticized for fitting seats of different sizes and shapes, as best shown in FIG. 1 of the '945 patent. The cover is also attached to the seat back by hook and loop fasteners to facilitate removal for cleaning.

A prior art product that is now commercially available from BMW of North America, Inc. is shown in FIGS. 9–12 of the present application. This seat cover is fabricated from a polycotton fabric and its proposed uses are to protect a seat from sun, sand, mud or snow. As best shown in FIG. 9 of the present application, the seat cover, generally indicated as S, is a one-piece cover that has an opening O at one end sized to be received over the headrest H upon raising, but without removing, the headrest. Hook and loop fasteners adjacent the opening are used to secure the top of the seat cover upon positioning the opening O about the two posts holding the headrest H to seat. This BMW opening O measures approximately twenty one inches in circumference. As best shown in FIG. 12 of the present application, the seat cover S includes a continuous border member B fabricated from an elastic material which urges the seat cover to the seat back and seat cushion. Furthermore, an elastic attachment strap A having a plastic mechanical fastener PF is provided in the mid section of the seat cover S to secure the seat cover at the juncture of the seat back and the seat cushion, as best shown in FIGS. 9 and 12 of the present application. A elastic strap C having a plastic J-hook, as best shown in FIGS. 9 and 12, is to be attached to the metal cross bar or frame used underneath the seat. The instructions for this seat cover S cautions that the installer should check to be sure the location of the J-hook does not interfere with the seat adjustment mechanism or wiring for the seat belt. Additionally, a nonslip rubberized material N is provided in the sides of the seat covers, as best shown in FIG. 11, apparently to reduce slippage of the seat cover relative to the seat.

While it appears that the proposed seat cover, as shown in FIGS. 9–12, serves to protect a seat, as would the seat covers as shown in the other above discussed devices, none of these devices in themselves disclose use of a terry cloth material where downward and lateral movement of the cloth member on the seat back and rearward and lateral movement of the cloth member on the seat cushion is limited by only a top cloth section and a bottom cloth section sewn to a cloth member, independent of other securing devices. Such a cloth member that would limit movement on the seat while being independent of mechanical plastic fasteners, straps or other elastic securing devices would facilitate use of the seat cover by providing quick installation and removal. Additionally, such a cover, which is easy to install and remove, would facilitate enjoyment of the feel and appearance of the leather or original fabric seat material by allowing ease in removal of the seat cover. Additionally, the quick installation of the terry cloth material would provide insulation when desired from the original seat material in hot and cold weather.

SUMMARY OF THE INVENTION

A one-piece terry cloth member sized to cover the top of a seat cushion and the front portion of a seat back includes a terry cloth top section sewn to a portion of the cloth member to provide a first opening to allow the top section and cloth member to pass over the headrest without moving the headrest. Furthermore, the sewn top section and cloth member limit downward and lateral movement of the cloth member covering the front portion of the seat back.

A bottom terry cloth section is sewn to a portion of the cloth member to provide a pocket. The pocket limits rearward and lateral movement of the cloth member on the seat cushion. Advantageously, a portion of the bottom cloth section is detached from the cloth member to allow a portion of the bottom section to cover the front face of the seat cushion.

The present invention fabricated substantially only from two terry cloth pieces facilitates manufacture, installation, removal, washing and storage of the seat cover. This flexibility and convenience of use enhances the installation and removal of the seat cover, as desired, while providing a protective covering that is ornamental and distinctive.

BRIEF DESCRIPTION OF THE DRAWINGS

The objects, advantages and features of the invention will become more apparent by reference to the drawings which are appended hereto, wherein like numerals indicate like parts and wherein an illustrated embodiment of the invention is shown, of which:

FIG. 1 is a perspective view of the ornamental and distinctive seat cover of the present invention installed on a seat having a headrest, as shown in phantom view;

FIG. 1A is a preferred plastic bag for distribution and storage of the folded seat cover of the present invention, as shown in FIG. 1;

FIG. 2 is a side view of the seat cover, as shown in FIG. 1, the other side view being a mirror image of FIG. 2;

FIG. 3 is a front view of the seat cover of the present invention, as shown in FIG. 1;

FIG. 4 is a plan view of the seat cover of the present invention, as shown in FIG. 1;

FIG. 5 is a rear view of the seat cover of the present invention, as shown in FIG. 1;

FIG. 6 is the front view of the one-piece cloth member of the present invention having a border member attached to its edge;

FIG. 7 is a back view of the seat cover of the present invention showing the back of the one-piece cloth member and the top cloth section and the bottom cloth section attached to portions of the one-piece cloth member;

FIG. 7A is an enlarged section view taken along line 7A—7A of FIG. 7;

FIG. 7B is an enlarged section view taken along line 7B—7B of FIG. 7;

FIG. 7C is a typical enlarged section view taken along line 7C—7C of FIG. 7 showing the approximate beginning of the edge of the bottom section, the cloth member is one piece and overlapped with the bottom section between these section cuts;

FIG. 7D is an enlarged section view taken along line 7D—7D of FIG. 7 showing the overlapped portion of the cloth member and bottom section;

FIG. 8 is a perspective view of an alternative embodiment of the present invention shown on a conventional bench seat having two headrests;

FIG. 9 is a perspective view of a commercially available one-piece seat cover;

FIG. 10 is a front view of the commercially available one-piece cover of FIG. 9;

FIG. 11 is a side view of the commercially available one-piece seat cover of FIG. 9 having a cut-away and phantom views to show the nonslip rubberized material secured in the seat cover, the other side of the seat cover is a mirror image of FIG. 11; and FIG. 12 is a back view of the commercially available one-piece cover of FIG. 9 better illustrating the elastic border, mechanical fasteners, elastic straps and hook and loop fasteners for the opening.

DETAILED DESCRIPTION OF PREFERRED EMBODIMENT

The preferred embodiment of the present invention, as shown in FIGS. 1–7, includes an ornamental and distinctive seat cover, generally indicated at 10, adapted for use with a seat having a headrest H, as shown in phantom view. The seat includes a seat back SB and a seat cushion SC, as shown in phantom view. The seat back SB includes a front portion, indicated as F, lying below the cloth member 12 of the present invention and a rear portion R, as best shown in FIGS. 2 and 5. The seat cushion SC includes a top T, below the cloth member 12 of the present invention, and a front face FF, below the bottom section 26 of the present invention.

The seat cover 10 includes a one-piece cloth member, generally indicated at 12, having an edge 12' in all locations except where overlapped with the bottom section as discussed below in detail and as best shown in FIGS. 7A, 7B, 7C and 7D. The one-piece cloth member 12, as shown in the figures, is sized to cover the top T of the seat cushion SC and the front portion F of the seat back SB.

The seat cover 10 further includes a top terry cloth section 16, as best shown in FIGS. 1, 2, 5, 7 and 7A. As shown in FIG. 7A, the top section 16 has an edge 16'. A portion of the top section edge 16' is fixedly attached, preferably by sewing, to the top end of the cloth member edge 12', as best shown in FIG. 7A. A first opening 20, as best shown in FIG. 4, is provided when the edges 12' and 16' of the one-piece cloth member 12 and the top section 16, respectively, are not sewn together and independent non-elastic border members 14 are sewn to the respective edges 12' and 16' about the circumference of the opening 20. Preferably, the opening is 12" in length or 24" in circumference so as to allow the seat cover 10 to pass over the headrest H without moving or raising the headrest.

A second opening 22 is provided between the edge 16' and the cloth member 12. The second opening, as best shown in FIGS. 1, 2, 5 and 7, allows the top section and the cloth member to extend over the front portion F and rear portion R of the seat back SB. Preferably, portions of edge 16' of the top section 16 are attached to the edge 12' of the cloth member 12 by sewing, with conventional heavy duty thread 14', a non-elastic border member 14 overlapping the edges. Additionally, as best shown in FIGS. 5 and 7, while a border member is not preferably used with the bottom edge 16' of the top section 16 used to define the second opening 22, an ornamental design pattern strip, generally indicated at 24, could be preferably sewn or alternatively appliqued with the bottom edge 16' of the top section. The sewing of this strip 24 onto the bottom edge 16' of the top section also resists unraveling of the bottom edge 16' of the preferred terry cloth top section 16.

Additionally, the bottom section 26, as best shown in FIGS. 1, 2, 3, 7 and 7C, includes an edge 26'. In particular, as best shown in FIGS. 7 and 7D, the cloth member 12 and bottom section 26 are preferably one continuous piece that would be overlapped and not separated. However, because of the rounding of the seat cover 10 at the bottom, the terry cloth would be cut at approximately the beginning of the sections 7C—7C, as shown in FIG. 7, to provide edges 12' and 26', as shown in FIG. 7C. Portions of the edge 26' are covered with a non-elastic border member 14 to provide an ornamental design to the seat cover 10 while reducing the opportunity for unraveling of the terry cloth material. The portion of the bottom section edge 26' attached to the cloth member edge 12' presents a pocket, generally indicated at 30. This pocket 30 limits rearward and lateral movement of the cloth member 12 on the seat cushion SC. The border member 14, as best shown in FIGS. 7, 7C and 7D, overlaps the edges 12' and 26' or the overlapped portion, as discussed above, and are preferably sewn with heavy duty thread 14'.

As best shown in FIG. 7, a portion of the edge 26' having a border member 28 of the bottom section 26 is detached from the cloth member 12 so that the defined portion 32 of the bottom section 26 covers the front face FF of the seat cushion SC. As best shown in FIGS. 1, 2 and 3, preferably, the detached portion 32 of the bottom section 26 covers all of the front face FF of the seat cushion SC to protect the front of the seat cushion from damage. In particular, damage from shoes, particularly cleated shoes, or rubbing in of moisture, mud, sand, snow and other undesirable elements into the seat original fabric or leather will be limited.

As best shown in FIGS. 1, 3 and 4, it is contemplated that the terry cloth material will include an indicia that is either sewn in or positioned on by applique or silk screen. This indicia could include identification or initials of a car manufacturer, the owner e.g. MJ, clubs, schools or other organizations and establishments. This indicia could also include other ornamental designs.

Preferably, the one-piece cloth member 12, the top section 16 and the bottom section 26 are fabricated from terry cloth, in particular, a combed cotton face 100% cotton, cotton/algodon material distributed by Fieldcrest of Kannapolis, N.C. under the trademark "ROYAL VELVET". This material, which comes in a variety of colors, is machine washable and can be tumbled dry. This ability to clean and dry in conventional washers and dryers facilitates use of the seat cover of the present invention. Preferably, the border members 14 and 28 are fabricated from a 1" wide nylon webbing distributed by Legett's Fabric of Houston, Tex. Legett's Fabric's identification for this nylon webbing is No. 0241.

Different color non-elastic border material may be used with different colored terry cloth cloth members, top sections and bottom sections to provide an ornamental design to the present invention in combination with the overall configuration of the seat cover 10 which makes it desirable to the most fastidious owners of luxury vehicles and vessels.

Turning to FIG. 8, an alternative embodiment of the present invention is shown, where similar elements, as shown in FIGS. 1–7, are indicated on the alternative embodiment of FIG. 8 but including the letter "A". FIG. 8 is a conventional bench seat having two headrests. Therefore, the width of the alternative embodiment of the present invention is elongated and includes two openings 20A', 20A" where the top section 16A is not sewn to the cloth member 12A.

Method of Use

The preferable terry cloth material of the seat cover 10 of the present invention is foldable. As best shown in FIG. 1A, the folded seat cover 10 can be distributed and stored in a reusable storage bag or pouch 34. A preferred bag is sold by Organize-It-All, Inc. of Moonachie, N.J., Style No. 625, and is fabricated from a soft touch clear vinyl using a heavy duty binding having a nylon zipper 36.

The seat cover is first removed from the bag 34 and unfolded. Without raising or removing the headrest H, the seat cover is then oriented so that the opening 20 is positioned about the headrest H and pulled downwardly so to pass over the headrest H. The top section 16 is then pulled downwardly until the sewn edges 16', 12' of the top section 16 and the cloth member 12, respectively, overlapped by the non-elastic border material 14 engage the top of the seat back SB preventing further downward movement of the cloth member. The portions of the top section 16 and the cloth member 12 sewn together positioned on the sides of the seat back SB limit lateral movement of the cloth member 12 relative to the front portion F of the seat back SB. Without further attachments, straps or fasteners, the pocket 30 of the seat cover 10 is pulled, preferably placing a small tension within the cloth member 12, over the juncture of the top of the seat cushion and the front face of the seat cushion, as shown in the FIGS. 1 and 2, to limit rearward and lateral movement of the cloth member 12 relative to the seat cushion SC. The detached portion 32 with its border member 28 of the bottom section 26 is pulled downwardly to preferably completely cover the front face FF of the seat cushion SC to provide an ornamental appearance to the seat cover 10 while also providing a protective covering to the front face FF of the seat cushion SC.

Removal of the cover 10 is achieved by a forward and upwardly pulling of the seat cover 10 relative to the seat cushion SC to release the bottom section 26 from the seat cushion SC. The top section 16 and its attached cloth member 12 are then pulled upwardly past the headrest H, again without moving the headrest. The seat cover 10 can then be folded and placed back in its protective bag 34, or if soiled, can be machine washed and reused or stored.

The dimensions of the preferred embodiment of the seat cover 10, as shown in FIGS. 1–7, before initial washing, are a total length of 44" and a total width of 28". These dimensions are the best mode in view of the terry cloth material being supplied in 68"×28" bulk dimensions. Turning to FIG. 7, the length of the top section 16 is preferably 12". The bottom section preferably has a length of 12" including the detached portion 32 which has a length of 5". This leaves a length for the exposed back of the cloth member, as shown in FIG. 7, of 20". The opening 20, as best shown in FIGS. 1 and 7, preferably has a length of 12" when laid flat, as in FIG. 7, or a circumference of 24". The opening 22, as best shown in FIGS. 1, 2, 5 and 7, preferably has a length of the total width of 28" or a circumference of 56".

As a seat cover for a bench seat of FIG. 8 has not been built, no dimensions are known for this alternative embodiment except that they are to achieve the structure and function of the present invention, as described above.

The foregoing disclosure and description of the invention are illustrative and explanatory thereof, and various changes in the size, shape and materials, as well as the details of the illustrated construction may be made without departing from the spirit of the invention.

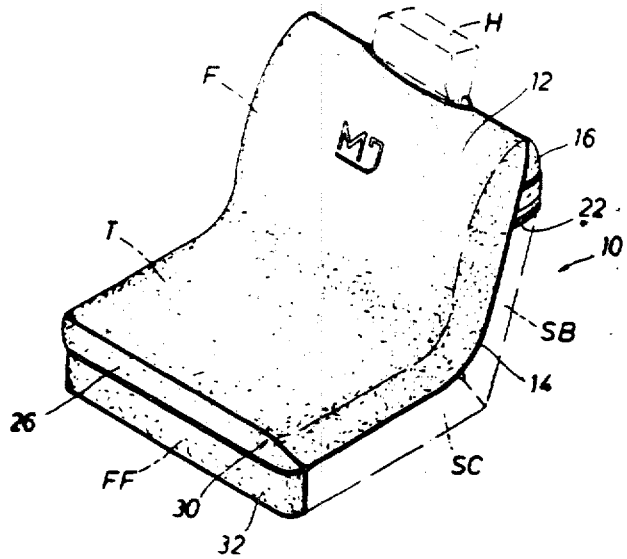

I claim:

1. Apparatus adapted for use with a seat having a headrest, the seat including a seat back having a front portion and a rear portion, and a seat cushion having a top and a front face, the apparatus comprising:

a one-piece cloth member having an edge and adapted to cover the top of the seat cushion and the front portion of the seat back;

a top section having an edge, a portion of said top section edge being fixedly attached to a portion of the cloth member edge to provide a first opening and a second opening formed between said top section edge and said cloth member edge for allowing the top section and the cloth member to pass over the headrest and the top section to extend over the rear portion of the seat back to limit downward movement of the cloth member when adapted to cover the front portion of the seat back; and a bottom section having an edge, a portion of said bottom section edge being fixedly attached to a portion of the cloth member edge to limit rearward movement of the cloth member when adapted to be placed on the seat cushion top while allowing a portion of the bottom section to be adapted to cover a portion of the front face of the seat cushion.

2. Apparatus of claim 1 wherein a border member overlaps a portion of said cloth member edge and a portion of said top section edge.

3. Apparatus of claim 2 wherein thread is used to attach said border member to said cloth member edge and said top section edge.

4. Apparatus of claim 1 wherein said first opening is sized to be received about the seat back.

5. Apparatus of claim 1 wherein said first opening is approximately 56 inches in circumference.

6. Apparatus of claim 1 wherein said second opening is smaller than said first opening and adapted to be received over said headrest without moving the headrest relative to the seat.

7. Apparatus of claim 1 wherein said second opening is approximately 24 inches in circumference.

8. Apparatus of claim 1 wherein said cloth member includes an indicia.

9. Apparatus of claim 8 wherein said indicia is positioned in an area on said cloth member that is adapted to cover the front portion of the seat back.

10. Apparatus of claim 1 when adapted to limit movement on the seat is being independent of straps or elastic securing devices.

11. Apparatus of claim 1 wherein downward and lateral movement of said cloth member when adapted to be placed on the seat back and rearward and lateral movement of said cloth member when adapted to be placed on the said seat cushion is limited by said cloth member, said top section and said bottom section being attached independent of other securing devices.

12. Apparatus of claim 1 wherein a portion of said edge of said bottom section being sewn to said cloth member edge to provide a pocket, said pocket limiting rearward and lateral movement of said cloth member when adapted to be placed on the seat cushion top.

13. Apparatus of claim 12 wherein said cloth member is fabricated from terry cloth.

14. Apparatus of claim 13 being free of elastic rubber components and a tension being placed on said cloth member when said pocket is adapted to be positioned on the seat cushion and the top section is adapted to be positioned about the seat back.

15. Apparatus of claim 1 wherein a portion of said edge of said bottom section being detached from said cloth member so that a portion of said bottom section is adapted to cover the front face of the seat cushion.

16. Apparatus of claim 1 being washable when adapted to be placed in a washing machine and dried in a dryer.

17. Apparatus of claim 1 being foldable, said apparatus further comprising
a bag sized to receive said folded apparatus.

18. Apparatus of claim 1 further comprising
a non-elastic border member attached to said edge of said cloth member and to a portion of said edge of said top section and a portion of said bottom section.

19. Apparatus adapted for use with a seat having a headrest, the seat including a seat back having a front portion and a rear portion, and a seat cushion having a top and a front face, the apparatus comprising:
a one-piece terry cloth member having an edge and adapted to cover the top of the seat cushion and the front portion of the seat back;
a top section having an edge, a portion of said top section edge being sewn to a portion of the cloth member edge to provide a first opening and a second opening formed between said top section edge and said cloth member edge for allowing the top section and the cloth member to pass over the headrest and the top section to extend over the rear portion of the seat back; said sewn top section edge and said cloth member edge limiting downward and lateral movement of the cloth member when adapted to cover the front portion of the seat back; said second opening is smaller than said first opening and adapted to be received over said headrest without moving the headrest relative to the seat; and
a bottom section having an edge, a portion of said bottom section edge being sewn to a portion of the cloth member edge to limit rearward and lateral movement of the cloth member when adapted to be placed on the seat cushion while allowing a portion of the bottom section to be adapted to cover a portion of the front face of the seat cushion.

20. Apparatus adapted for use with a seat having a headrest, the seat including a seat back having a front portion and a rear portion; and a seat cushion having a top and a front face, the apparatus comprising:
a one-piece foldable cloth member having an edge and adapted to cover the top of the seat cushion and the front portion of the seat back;
a top section having an edge, said top section edge being fixedly attached to a portion of the cloth member edge to provide a first opening and a second opening formed between said top section edge and said cloth member edge for allowing the top section and the cloth member to pass over the headrest and the top section to extend over the rear portion of the seat back to limit downward and lateral movement of the cloth member covering the front portion of the seat back; and
a bottom section having an edge, a portion of said bottom section edge being fixedly attached to a portion of the cloth member edge to provide a pocket, said pocket limiting rearward and lateral movement of the cloth member when adapted to be placed on the seat cushion; a portion of said bottom section being detached from said cloth member for allowing a portion of the bottom section to cover a portion of the front face of the seat cushion.

* * * * *

UNITED STATES PATENT AND TRADEMARK OFFICE
CERTIFICATE OF CORRECTION

PATENT NO. : 5,618,082

Page 1 of 2

DATED : April 8, 1997

INVENTOR(S) : Jachmich

It is certified that error appears in the above-identified patent and that said Letters Patent is hereby corrected as shown below:

SUBSTITUTE THE TITLE PAGE,
WITH THE ATTACHED TITLE PAGE,
WRONG FIGURE PRINTED ON TITLE PAGE:

Signed and Sealed this

Tenth Day of March, 1998

*Attest:*

BRUCE LEHMAN

*Attesting Officer*   *Commissioner of Patents and Trademarks*

United States Patent
Jachmich

Patent Number: 5,618,082
Date of Patent: Apr. 8, 1997

[54] QUICK INSTALL COVER FOR A SEAT

[76] Inventor: Manfred F. Jachmich, 5100 San Felipe East Four Leaf Tower, Apt. 111-E, Houston, Tex. 77056

[21] Appl. No.: 714,242

[22] Filed: Sep. 16, 1996

[51] Int. Cl.$^6$ ........................................ A47C 31/00
[52] U.S. Cl. .................. 297/229; 297/228.1; 297/219.1
[58] Field of Search ........................... 297/218.1, 219.1, 297/225, 224, 228.11, 228.1, 229, 220; 2/69, 69.5

[56] References Cited

U.S. PATENT DOCUMENTS

| | | | |
|---|---|---|---|
| 1,547,085 | 7/1925 | Tucker | 2/69.5 |
| 2,619,156 | 11/1952 | Seaman | 297/228.11 |
| 3,892,440 | 7/1975 | Dudley et al. | 297/229 |
| 4,232,898 | 11/1980 | Bodrero | |
| 4,400,030 | 8/1983 | Maruzzo et al. | 297/228.1 |
| 4,536,028 | 8/1985 | Jones et al. | 297/224 |
| 4,671,568 | 6/1987 | Greer | 297/229 |
| 4,676,376 | 6/1987 | Keiswetter | |
| 4,694,511 | 9/1987 | Estes et al. | 2/69 |
| 4,718,721 | 1/1988 | Pompa | 297/229 |
| 4,725,094 | 2/1988 | Greer | 297/229 |
| 4,877,288 | 10/1989 | Lee | 297/229 |
| 4,892,353 | 1/1990 | Goddard | 297/224 |
| 5,005,901 | 4/1991 | Hinde | 297/229 |
| 5,150,945 | 9/1992 | Aupperlee et al. | |

OTHER PUBLICATIONS

Automr_, Interiors by Sagaz®, Natural Sheepskin Limited Edit..n, Part #300107B, Label Pt# 3061-752-00-01 (2 pages).

Precision Auto Designs, A Division of First Automotive, Inc. a California Corporation, 1995 Edition XIII Our 18th Year. Cover page and page 5 (2 pages total).

1992 BMW Accessories, ©1991 BMW of North America, Inc. Cover page, page 18 and part number page for page 18 and back cover page (4 pages total).

Neimen Marcus Catalog 1996 with Item 30J with photo (one page).

Organize-It-All, Inc. Moonachie, N.J. 07074 ©1993, Sweater Bags, Style No. 625 (one page).

Original BMW Accessories ©1994 BMW of North America, Inc., cover page, pp. 29, 68, 69 (including below Part No. 82 11 1 467 706) and back cover page (5 pages total).

Original BMW Accessories ©1995 BMW of North America, Inc. Cover page, pp. 33 and 54–56 (including below Part No. 82 11 1 467 706) and back cover page (4 pages total).

Copy of photo from box of BMW Part No. 82 11 1 467 706 for "Custom Seat Savers™ cover" as shown in Figures 9–12 of the present application.

Seat Savers® Installation & Care Instructions, Form #1320018 for cover as shown in Figures 9–12 of the present invention, along with a copy of Invoice No. 68781 from Momentum BMW purchased Aug. 27, 1996.

Enlarged copy of tag from "Royal Velvet" terry cloth towel by Fieldcrest of Kannapolis, NC, one page (admitted prior art).

Primary Examiner—Peter M. Cuomo
Assistant Examiner—Anthony D. Barfield
Attorney, Agent, or Firm—Pravel, Hewitt, Kimball & Krieger

[57] ABSTRACT

A one-piece terry cloth member sized to cover a seat includes a terry cloth top section selectively sewn to the cloth member to provide a first opening to allow the top of the cover to pass over the headrest while limiting downward and lateral movement of the cloth member covering the front portion of the seat back. A cloth bottom section is selectively sewn to the cloth member to provide a pocket. The pocket is pulled onto a seat, preferably placing a small amount of tension on the cloth member, to limit rearward and lateral movement of the cloth member on the seat cushion. Advantageously, a portion of the cloth bottom section is detached from the cloth member to cover the front face of the seat cushion.

20 Claims, 3 Drawing Sheets